(12) United States Patent
Nishida (10) Patent No.: US 12,104,653 B2
(45) Date of Patent: Oct. 1, 2024

(54) FRICTION CLUTCH AND STRADDLED VEHICLE INCLUDING THE SAME

(71) Applicant: YAMAHA HATSUDOKI KABUSHIKI KAISHA, Iwata (JP)

(72) Inventor: Kenji Nishida, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/328,018

(22) Filed: Jun. 2, 2023

(65) Prior Publication Data

US 2023/0407923 A1    Dec. 21, 2023

(30) Foreign Application Priority Data

Jun. 9, 2022  (JP) ................. 2022-093729

(51) Int. Cl.
*F16D 13/52*       (2006.01)
*F16D 127/00*     (2012.01)

(52) U.S. Cl.
CPC .......... *F16D 13/52* (2013.01); *F16D 2127/00* (2013.01)

(58) Field of Classification Search
CPC .......... F16D 13/52; F16D 13/644; F16D 3/12; F16D 7/027; F16D 13/648; F16D 13/683; F16D 25/0638; F16D 27/115
See application file for complete search history.

(56) References Cited

U.S. PATENT DOCUMENTS

| 3,631,953 | A | * | 1/1972 | Snoy | F16D 13/683 192/209 |
|---|---|---|---|---|---|
| 2002/0195307 | A1 | | 12/2002 | Linhuber et al. | |
| 2004/0195068 | A1 | * | 10/2004 | Sudau | F16D 13/648 192/70.12 |
| 2010/0126820 | A1 | * | 5/2010 | Inomori | F16D 25/086 29/452 |
| 2019/0211886 | A1 | * | 7/2019 | Ito | F16D 23/12 |

FOREIGN PATENT DOCUMENTS

| DE | 102014206729 | A1 | * | 10/2014 | ............ F16D 27/115 |
|---|---|---|---|---|---|
| EP | 3104045 | A2 | | 12/2016 | |
| JP | 2017003011 | A | | 1/2017 | |
| KR | 19980053569 | U | * | 10/1998 | ............. F16D 13/52 |

* cited by examiner

*Primary Examiner* — Stacey A Fluhart
(74) *Attorney, Agent, or Firm* — Rabin & Berdo, P.C.

(57) ABSTRACT

A friction clutch includes: a clutch shaft; a clutch housing; a clutch boss; a clutch sleeve; a plurality of first plates supported by a first sleeve portion of the clutch housing; a plurality of second plates supported by a second sleeve portion of the clutch sleeve; a pressure plate; a spring urging the pressure plate toward the first and second plates; and an absorber interposed between the clutch sleeve and the clutch boss. The absorber is disposed in a first direction relative to a second disk portion of the clutch boss and in a second direction, opposite to the first direction, relative to a third disk portion of the clutch sleeve.

7 Claims, 8 Drawing Sheets

FRICTION CLUTCH AND STRADDLED VEHICLE INCLUDING THE SAME

CROSS REFERENCE TO RELATED APPLICATIONS

This application claims the benefit of priority to Japanese Patent Application No. 2022-093729 filed on Jun. 9, 2022. The entire contents of this application are incorporated herein by reference.

BACKGROUND OF THE INVENTION

1. Field of the Invention

The present invention relates generally to friction clutches and straddled vehicles including the friction clutches. More particularly, the present invention relates to a friction clutch including an absorber to absorb an impact and a straddled vehicle including the friction clutch.

2. Description of the Related Art

Figure 9:
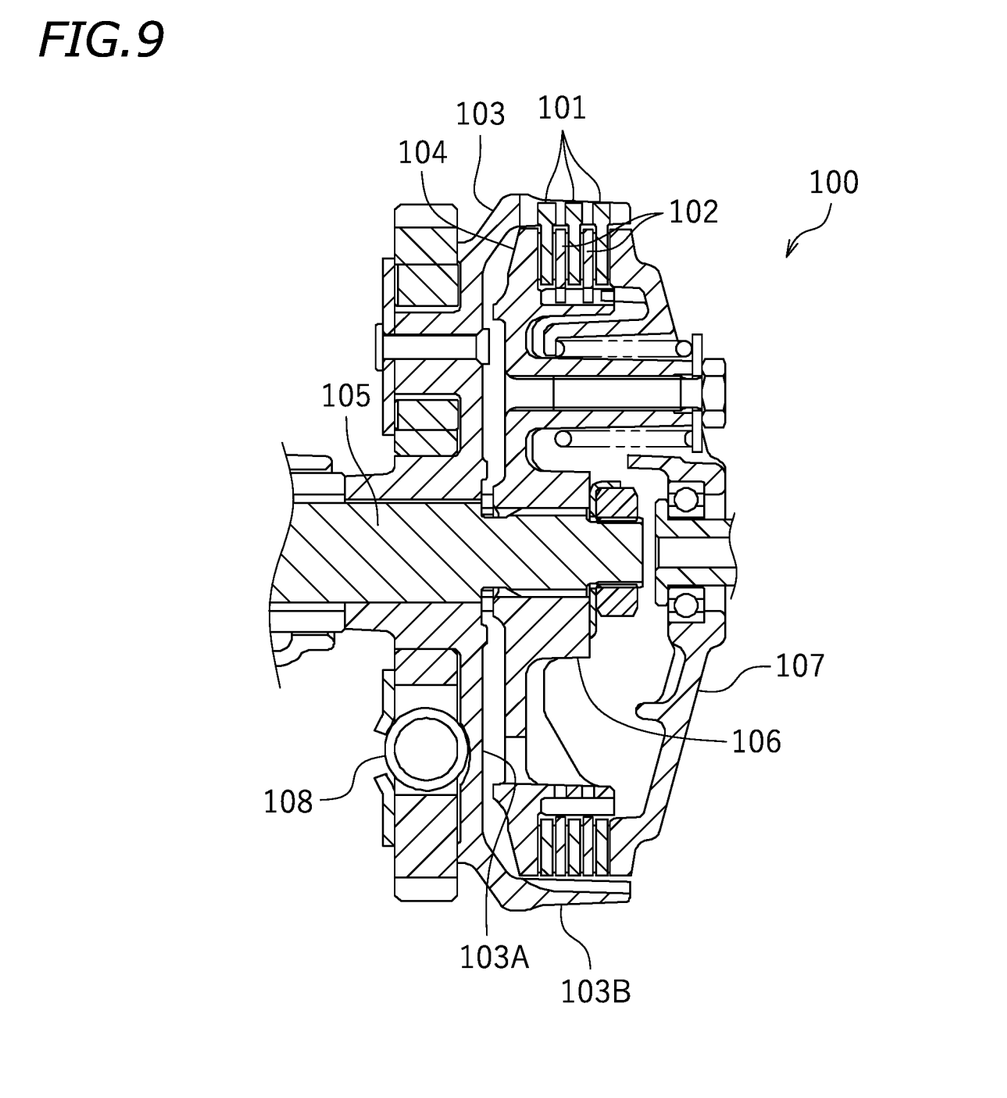
FIG. 9 is a cross-sectional view of an exemplary friction clutch known in the related art.

Straddled vehicles (such as motorcycles) known in the related art include multiplate friction clutches (see, for example, JP 2017-3011 A and US 2002/0195307 A1). As illustrated in FIG. 9, for example, a multiplate friction clutch 100 includes: a plurality of first plates 101; a clutch housing 103 supporting the first plates 101; a plurality of second plates 102; a clutch sleeve 104 supporting the second plates 102; a clutch shaft 105; a clutch boss 106 secured to the clutch shaft 105; and a pressure plate 107 to press the first and second plates 101 and 102 against each other. The clutch sleeve 104 and the clutch boss 106 of the friction clutch 100 are integral with each other.

Straddled vehicles are each provided with a friction clutch at a location somewhere along a power transmission mechanism through which a drive source, such as an internal combustion engine, is connected to a driving wheel. Engaging the friction clutch transmits a drive force from the drive source to the driving wheel. Disengaging the friction clutch cuts off transmission of power from the drive source to the driving wheel.

When the drive source is an internal combustion engine, an impactive force is transmitted from the drive source to the friction clutch for every combustion stroke. If the drive source is other than an internal combustion engine, an impactive force will be transmitted to the friction clutch upon sudden increase in torque output from the drive source. The friction clutch is provided with an absorber. When an impactive force is transmitted from the drive source to the friction clutch, the absorber reduces the impact of the force. The friction clutch 100 illustrated in FIG. 9 includes an absorber 108 disposed on the rear of the clutch housing 103 (i.e., disposed in the left portion of FIG. 9).

The clutch housing 103 of the friction clutch 100 illustrated in FIG. 9 includes a disk portion 103A and a sleeve portion 103B extending forward from the disk portion 103A. Disposing the absorber 108 on the rear of the clutch housing 103 unfortunately increases the dimension of the friction clutch 100 in the axial direction of the clutch shaft 105. The axial direction of a clutch shaft may hereinafter be simply referred to as an "axial direction".

Figure 10:
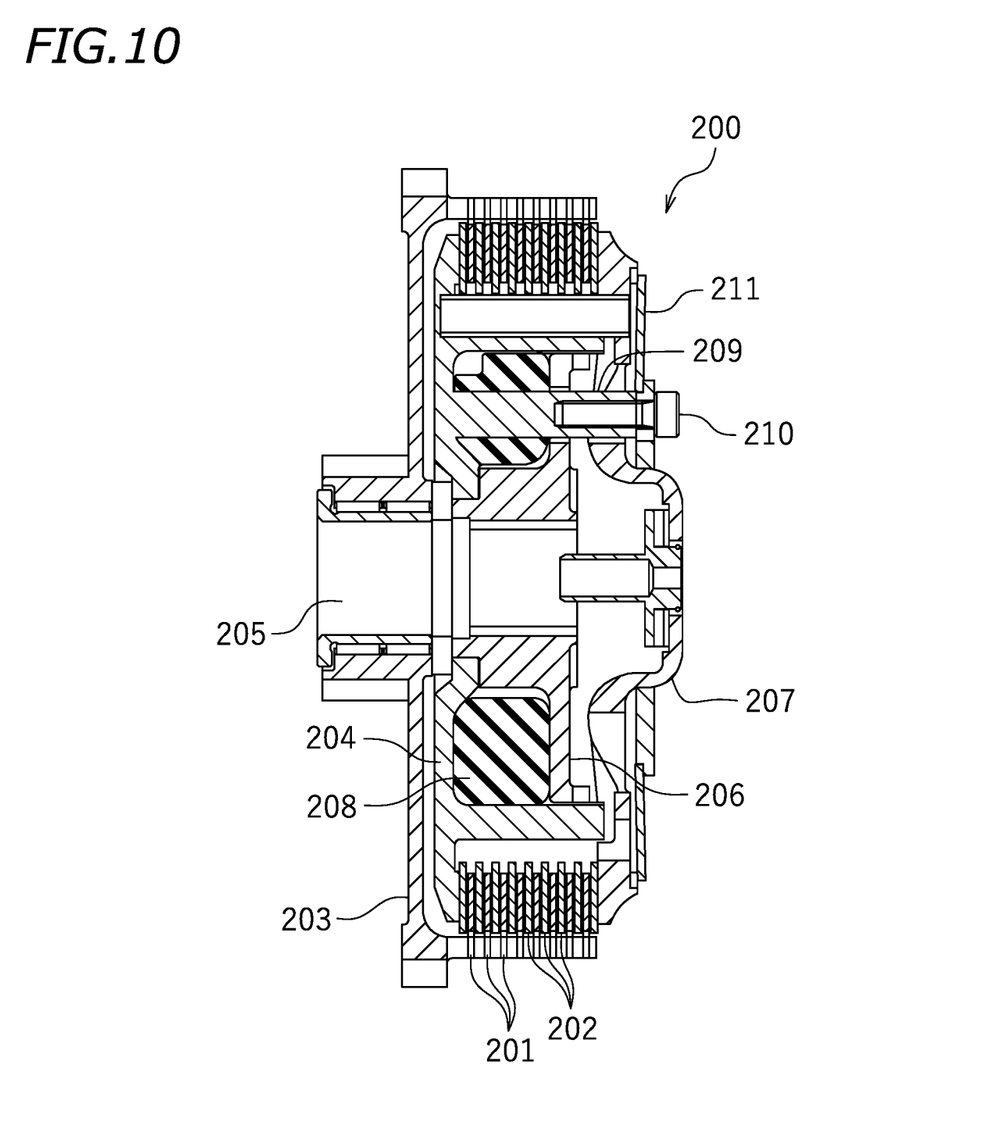
FIG. 10 is a cross-sectional view of another exemplary friction clutch known in the related art.

A friction clutch 200 illustrated in FIG. 10 is also known in the related art. The friction clutch 200 includes: a plurality of first plates 201; a clutch housing 203 supporting the first plates 201; a plurality of second plates 202; a clutch sleeve 204 supporting the second plates 202; a clutch shaft 205; a clutch boss 206 secured to the clutch shaft 205; and a pressure plate 207 to press the first and second plates 201 and 202 against each other. The clutch sleeve 204 and the clutch boss 206 are separate components. The friction clutch 200 further includes an absorber 208 disposed between the clutch sleeve 204 and the clutch boss 206. Because the absorber 208 is disposed forward of the clutch housing 203, the friction clutch 200 is reducible in dimension in the axial direction of the clutch shaft 205.

A spring 211 urging the pressure plate 207 is interposed between the pressure plate 207 and the clutch sleeve 204. The clutch sleeve 204 is provided with a boss portion 209 extending forward. The spring 211 is secured to the boss portion 209 with a bolt 210.

The absorber 208 of the friction clutch 200 needs to be disposed such that the absorber 208 bypasses the boss portion 209. This makes it difficult to increase the size of the absorber 208. The absorber 208, however, is preferably large in size so as to increase the amount of energy absorbable by the absorber 208.

Accordingly, embodiments of the present invention provide friction clutches each smaller in axial dimension and including a larger absorber, and straddled vehicles including the friction clutches.

SUMMARY OF THE INVENTION

An embodiment of the present invention provides a friction clutch including: a clutch shaft extending in a first direction; a clutch housing; a clutch boss; a clutch sleeve; a plurality of first plates; a plurality of second plates; a pressure plate; a spring; and an absorber. The clutch housing includes: a first disk portion through which the clutch shaft passes; and a first sleeve portion extending in the first direction from the first disk portion. The clutch housing is supported so as to be rotatable relative to the clutch shaft. The clutch boss includes: a second disk portion disposed in the first direction relative to the first disk portion; and a first boss portion extending in the first direction from the second disk portion. The first boss portion is in engagement with the clutch shaft such that the first boss portion is non-rotatable relative to the clutch shaft. The clutch sleeve includes: a third disk portion disposed in the first direction relative to the second disk portion; and a second sleeve portion extending in a second direction from the third disk portion. The second direction is opposite to the first direction. The first plates are supported by the first sleeve portion. The first plates are arranged in the first direction. The second plates are supported by the second sleeve portion. The second plates are disposed such that the first and second plates are arranged alternately. The pressure plate is disposed in the first direction relative to the third disk portion. The pressure plate is configured to press the first and second plates against each other. The spring is attached to the clutch sleeve and the pressure plate. The spring urges the pressure plate toward the first and second plates. The absorber is disposed in the first direction relative to the second disk portion and disposed in the second direction relative to the third disk portion. The absorber is interposed between the clutch sleeve and the clutch boss.

As used herein, the term "first direction" refers to a forward direction, i.e., a direction toward the front of the friction clutch, and the term "second direction" refers to a rearward direction, i.e., a direction toward the rear of the friction clutch. The absorber of the friction clutch is disposed forward of the clutch housing. The axial dimension of the friction clutch is thus reducible. The clutch sleeve is disposed forward of the clutch boss. Accordingly, a sufficiently large space is provided between the clutch boss and the clutch sleeve. Consequently, a space for housing the absorber is increased so as to increase the absorber in size.

The clutch sleeve may include a second boss portion extending in the first direction from the third disk portion. The spring may be attached to the second boss portion with a bolt.

In such an embodiment, the second boss portion having the spring attached thereto extends forward from the third disk portion. No second boss portion is present between the clutch boss and the clutch sleeve. Accordingly, a sufficiently large space is provided between the clutch boss and the clutch sleeve. Because the second boss portion causes no interference, such an embodiment is able to increase the absorber in size.

The clutch boss may include a first wall extending in the first direction from the second disk portion and extending outward in a radial direction of the clutch shaft. The clutch sleeve may include a second wall extending in the second direction from the third disk portion and extending inward in the radial direction of the clutch shaft. At least a portion of the absorber may be disposed between the first wall and the second wall as viewed in an axial direction of the clutch shaft.

The absorber may include a facing surface facing the third disk portion. The third disk portion may extend outward in a radial direction of the clutch shaft and in the first direction. The facing surface of the absorber may extend outward in the radial direction of the clutch shaft and in the first direction.

In such an embodiment, the third disk portion of the clutch sleeve is recessed forward, enabling the absorber to be larger in size.

The absorber may be made of rubber.

Another embodiment of the present invention provides a straddled vehicle including the friction clutch described above.

Various embodiments of the present invention provide friction clutches each smaller in axial dimension and including a larger absorber, and straddled vehicles including the friction clutches.

DETAILED DESCRIPTION OF THE PREFERRED EMBODIMENTS

Figure 1:
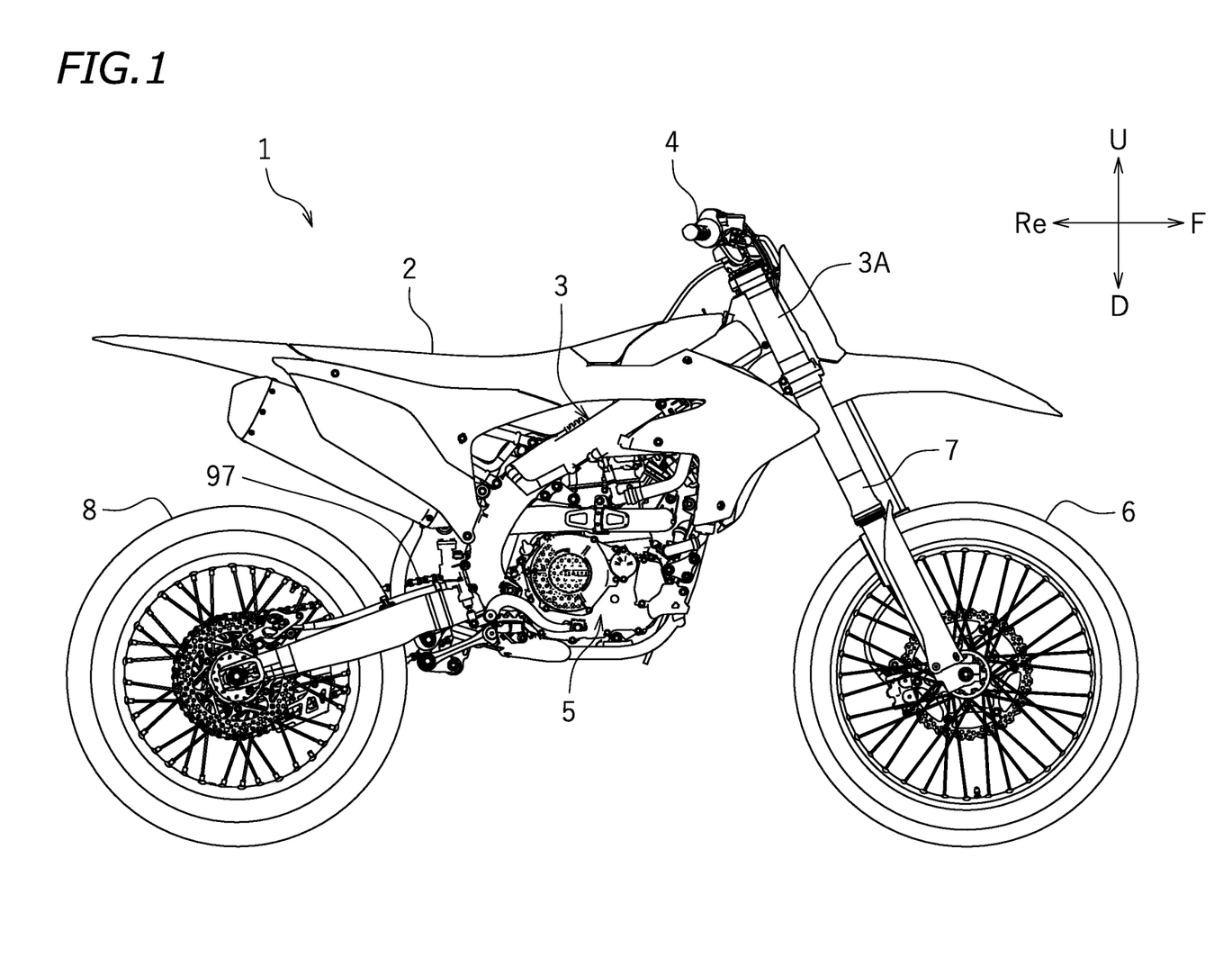
FIG. 1 is a right side view of a motorcycle according to a first embodiment of the present invention.

Friction clutches and straddled vehicles according to embodiments of the present invention will be described below with reference to the drawings. FIG. 1 is a right side view of a motorcycle 1, which is an exemplary straddled vehicle.

Unless otherwise specified, the terms "front", "rear", "left", "right", "up", and "down" used in the following description respectively refer to front, rear, left, right, up, and down with respect to a virtual rider sitting on a seat 2 of the motorcycle 1 on the assumption that the motorcycle 1 with no rider or baggage is stationary in an upright position on a horizontal plane. The reference signs "F", "Re", "L", "R", "U", and "D" in the drawings respectively represent front, rear, left, right, up, and down.

First Embodiment

A first embodiment of the present invention will now be described. The motorcycle 1 includes: a body frame 3 including a head pipe 3A; the seat 2 on which a rider is to sit; a power unit 5; a front wheel 6; and a rear wheel 8. The head pipe 3A supports a steering shaft (not illustrated) such that the steering shaft is rotatable to the right and left. A handlebar 4 is secured to an upper portion of the steering shaft. A front fork 7 is secured to a lower portion of the steering shaft. The front fork 7 supports the front wheel 6.

Figure 2:
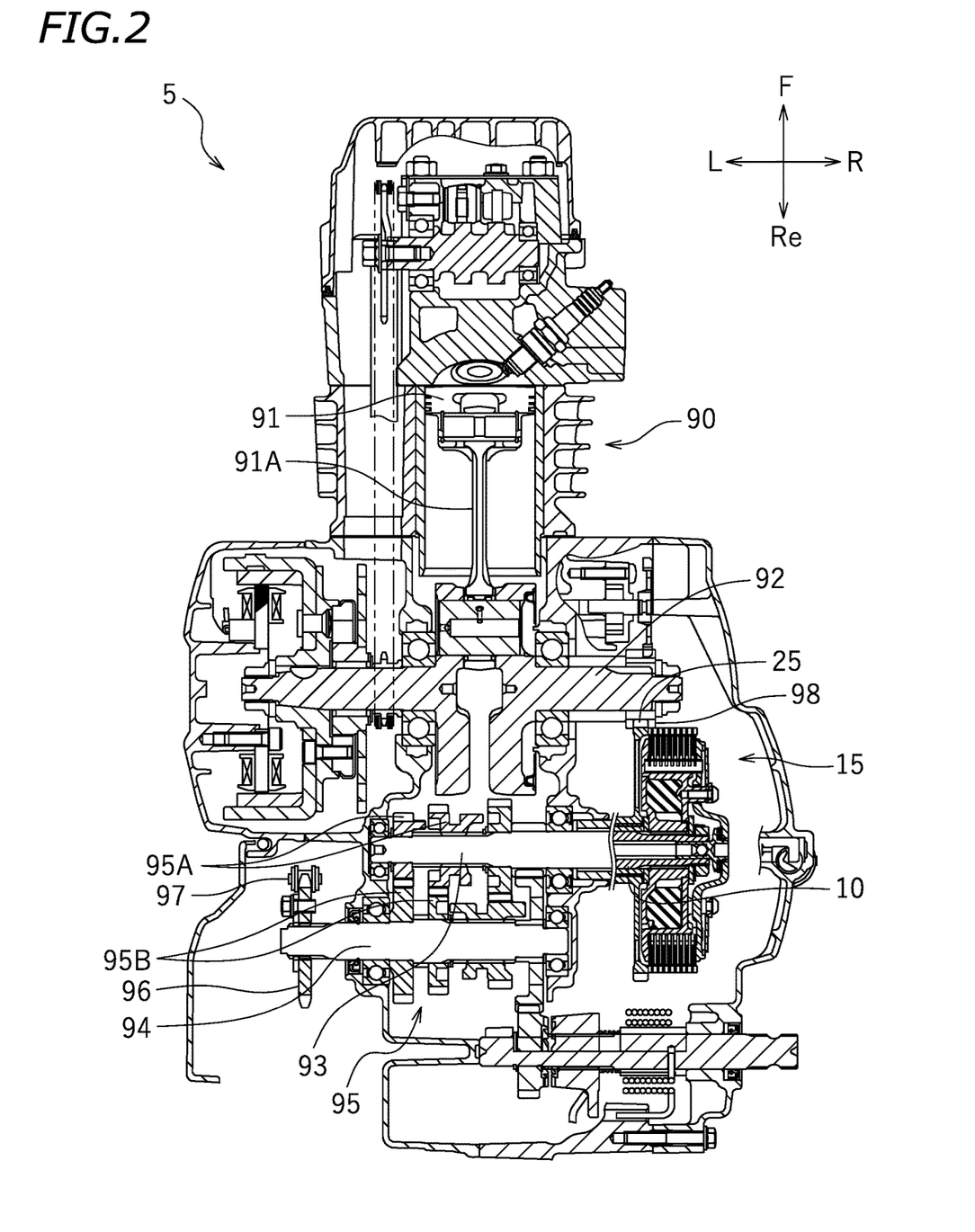
FIG. 2 is a cross-sectional view of a power unit.

FIG. 2 is a cross-sectional view of the power unit 5. The power unit 5 includes: an internal combustion engine 90 serving as a drive source for travel; a friction clutch 15 (hereinafter referred to as a "clutch 15"); and a transmission 95. The internal combustion engine 90 includes: a piston 91; a connecting rod 91A connected to the piston 91; and a crankshaft 92 connected to the connecting rod 91A. The power unit 5 further includes a main shaft 93 and an output shaft 94. The crankshaft 92, the main shaft 93, and the output shaft 94 are parallel or substantially parallel to each other. The crankshaft 92, the main shaft 93, and the output shaft 94 each extend in a right-left direction. The transmission 95 includes: a plurality of drive gears 95A provided on the main shaft 93; and a plurality of driven gears 95B provided on the output shaft 94. A sprocket 96 is secured to the output shaft 94. The sprocket 96 and the rear wheel 8 are connected to each other through a chain 97 serving as a power transmission member. A drive force of the crankshaft 92 is transmitted to the rear wheel 8 through the clutch 15, the main shaft 93, the drive gears 95A, the driven gears 95B, the output shaft 94, the sprocket 96, and the chain 97. The clutch 15 is provided at a location somewhere along a power transmission mechanism through which the drive force of the crankshaft 92 is to be transmitted to the rear wheel 8.

Figure 3:
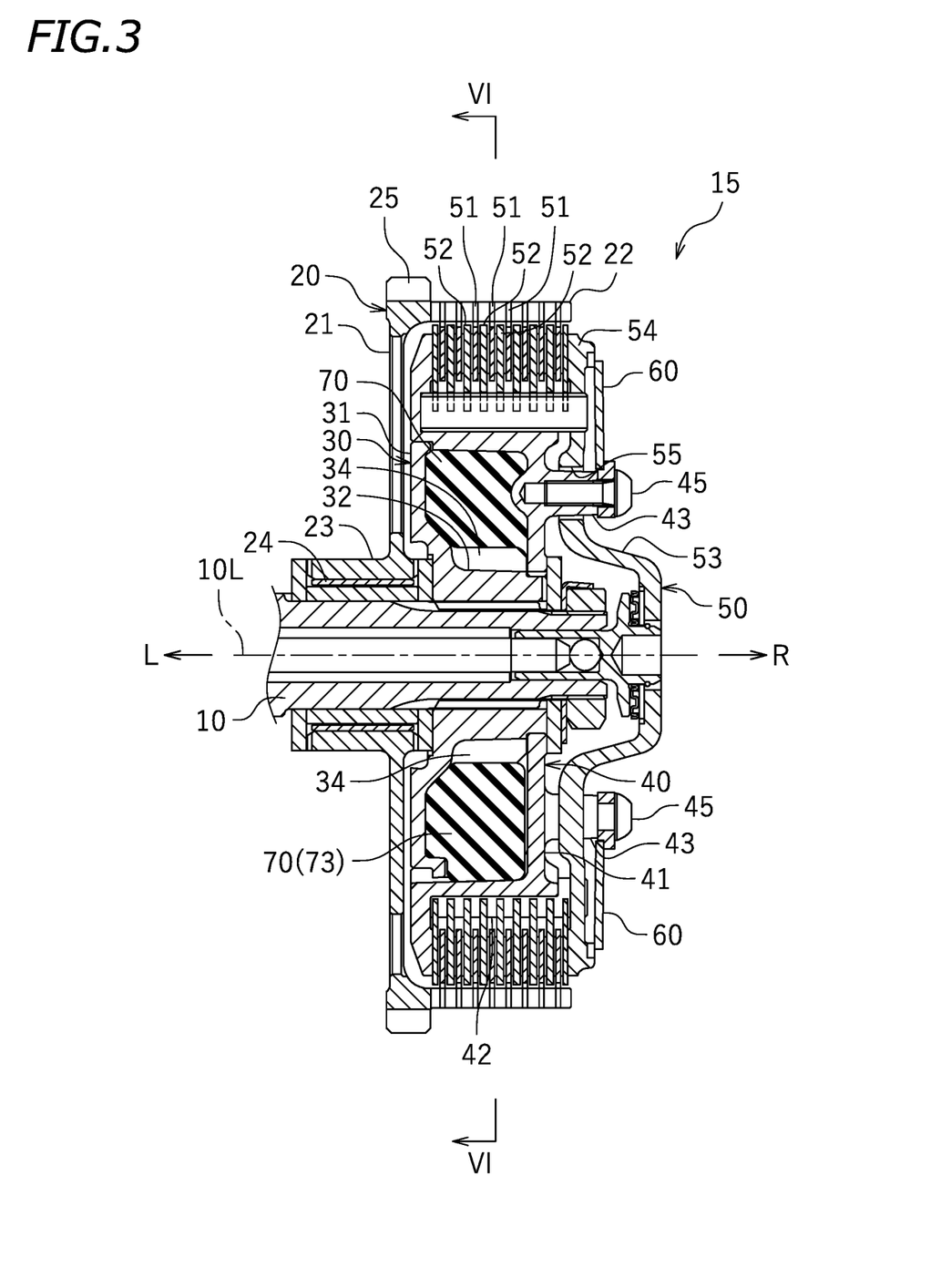
FIG. 3 is a cross-sectional view of a friction clutch according to the first embodiment of the present invention.

FIG. 3 is a cross-sectional view of the clutch 15. The clutch 15 includes a clutch shaft 10, a clutch housing 20, a clutch boss 30, a clutch sleeve 40, a pressure plate 50, a spring 60, and absorbers 70.

The clutch shaft 10 extends rightward. As used herein, the term "rightward" refers to an example of a "first direction", and the term "leftward" refers to an example of a "second direction". In the following description concerning the clutch 15, the term "rightward" may refer to "forward", and the term "leftward" may refer to "rearward". In the first embodiment, the clutch shaft 10 is integral with the main shaft 93 (see FIG. 2). The clutch shaft 10 and the main shaft 93 are in the form of a single component. Alternatively, the clutch shaft 10 and the main shaft 93 may be separate components. The reference sign 10L in the drawings represents the axis of the clutch shaft 10. In the first embodiment, the main shaft 93 is disposed on the axis 10L of the clutch shaft 10. The main shaft 93, however, does not necessarily have to be disposed on the axis 10L of the clutch shaft 10.

In one example, the clutch shaft 10 and the main shaft 93 may be disposed in parallel or substantially in parallel with each other.

The clutch housing 20 includes: a first disk portion 21 through which the clutch shaft 10 passes; a first sleeve portion 22 extending rightward from the first disk portion 21; and a boss portion 23 extending leftward from the first disk portion 21. The first disk portion 21 has a disk shape whose center corresponds to the axis 10L of the clutch shaft 10. The first sleeve portion 22 has a cylindrical shape whose center corresponds to the axis 10L of the clutch shaft 10. A bearing 24 is provided between the boss portion 23 and the clutch shaft 10. The clutch housing 20 is rotatably supported by the clutch shaft 10. The clutch housing 20 is rotatable relative to the clutch shaft 10. The clutch housing 20 is provided with a gear 25. The gear 25 is in mesh with a gear 98 (see FIG. 2) secured to the crankshaft 92. The drive force is transmitted from the crankshaft 92 to the clutch housing 20 through the gear 98 and the gear 25.

Figure 4:
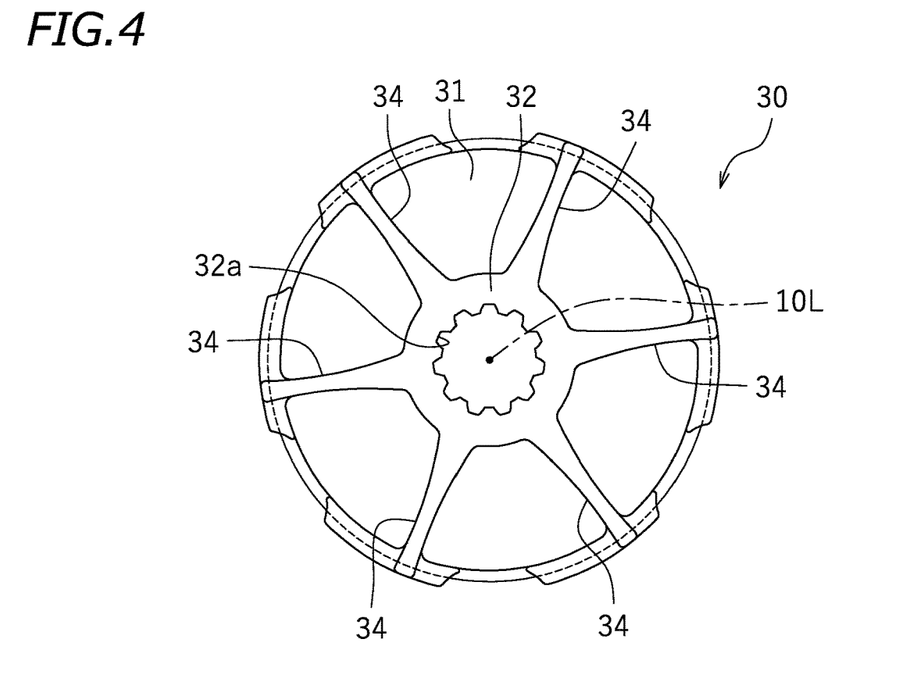
FIG. 4 is a right side view of a clutch boss.

FIG. 4 is a right side view of the clutch boss 30. The clutch boss 30 includes a second disk portion 31, a first boss portion 32, and a plurality of first walls 34. The second disk portion 31 has a disk shape whose center corresponds to the axis 10L of the clutch shaft 10. As illustrated in FIG. 3, the second disk portion 31 is disposed rightward of the first disk portion 21. The first boss portion 32 extends rightward from the second disk portion 31. The first boss portion 32 is in engagement with the clutch shaft 10 such that the first boss portion 32 is non-rotatable relative to the clutch shaft 10. As illustrated in FIG. 4, a hole defined in the first boss portion 32 is provided with spline grooves 32a. The first boss portion 32 and the clutch shaft 10 are spline-fitted to each other. The clutch boss 30 rotates together with the clutch shaft 10. The first walls 34 each extend rightward from the second disk portion 31 and extend outward in a radial direction of the clutch shaft 10. The first walls 34 are arranged in a radial pattern. The clutch boss 30 may be provided with any suitable number of first walls 34. In this embodiment, the number of first walls 34 is six. The first walls 34 are arranged at 60-degree intervals around the axis 10L of the clutch shaft 10.

Figure 5:
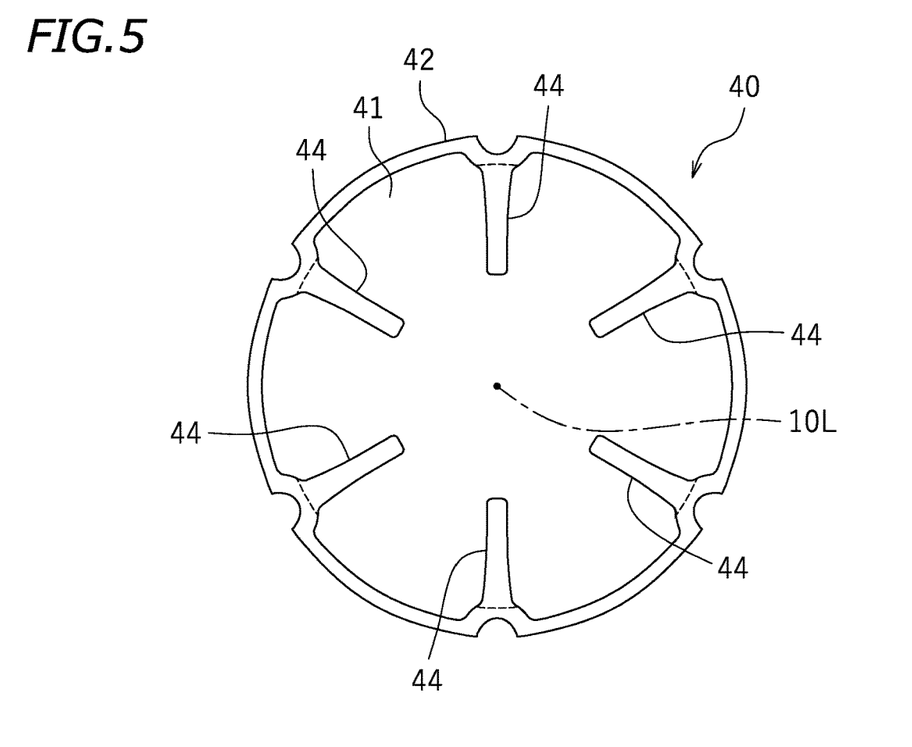
FIG. 5 is a left side view of a clutch sleeve.

FIG. 5 is a left side view of the clutch sleeve 40. The clutch sleeve 40 includes a third disk portion 41, a second sleeve portion 42, and a plurality of second walls 44. The third disk portion 41 has a disk shape whose center corresponds to the axis 10L of the clutch shaft 10. The second sleeve portion 42 has a cylindrical shape whose center corresponds to the axis 10L of the clutch shaft 10. As illustrated in FIG. 3, the third disk portion 41 is disposed rightward of the second disk portion 31. The second sleeve portion 42 extends leftward from the third disk portion 41. The second sleeve portion 42 is disposed outward of the first boss portion 32 in the radial direction of the clutch shaft 10. The second sleeve portion 42 is disposed inward of the first sleeve portion 22 in the radial direction of the clutch shaft 10. As illustrated in FIG. 5, the second walls 44 each extend leftward from the third disk portion 41 and extend inward in the radial direction of the clutch shaft 10. The second walls 44 are arranged in a radial pattern. The clutch sleeve 40 may be provided with any suitable number of second walls 44. In this embodiment, the number of second walls 44 is equal to the number of first walls 34, which means that the number of second walls 44 is six. The second walls 44 are arranged at 60-degree intervals around the axis 10L of the clutch shaft 10.

As illustrated in FIG. 3, the first sleeve portion 22 supports a plurality of first plates 51 arranged in a rightward direction. The second sleeve portion 42 supports a plurality of second plates 52 arranged in a rightward direction. The first and second plates 51 and 52 are disposed alternately.

The pressure plate 50 is a component to press the first and second plates 51 and 52 against each other. The pressure plate 50 is disposed rightward of the clutch sleeve 40. The pressure plate 50 includes: a disk portion 53; and a contact portion 54 in contact with a rightmost one of the first plates 51 or a rightmost one of the second plates 52. In this embodiment, the contact portion 54 is in contact with a rightmost one of the first plates 51.

The spring 60 urges the pressure plate 50 toward the first and second plates 51 and 52. In this embodiment, the spring 60 urges the pressure plate 50 leftward. The spring 60 is not limited to any particular type of spring. In the first embodiment, the spring 60 is a plate spring. The clutch sleeve 40 includes second boss portions 43 extending rightward from the third disk portion 41. Holes 55 are defined in the pressure plate 50. The second boss portions 43 each pass through an associated one of the holes 55. The spring 60 is attached to the second boss portions 43 with bolts 45. The spring 60 urges the pressure plate 50 leftward toward the clutch sleeve 40.

The absorbers 70 are components to reduce an impact transmitted from the clutch housing 20 to the clutch boss 30. In the first embodiment, the absorbers 70 are disposed between the clutch sleeve 40 and the clutch boss 30 so as to reduce an impact transmitted from the clutch sleeve 40 to the clutch boss 30. Any material that is able to reduce an impact may be used for the absorbers 70. In the first embodiment, the absorbers 70 are made of rubber. Preferable examples of materials usable for the absorbers 70 include hydrogenated nitrile rubber (HNBR). The absorbers 70 are disposed rightward of the second disk portion 31 of the clutch boss 30 and leftward of the third disk portion 41 of the clutch sleeve 40. The absorbers 70 are interposed between the clutch sleeve 40 and the clutch boss 30.

Figure 6:
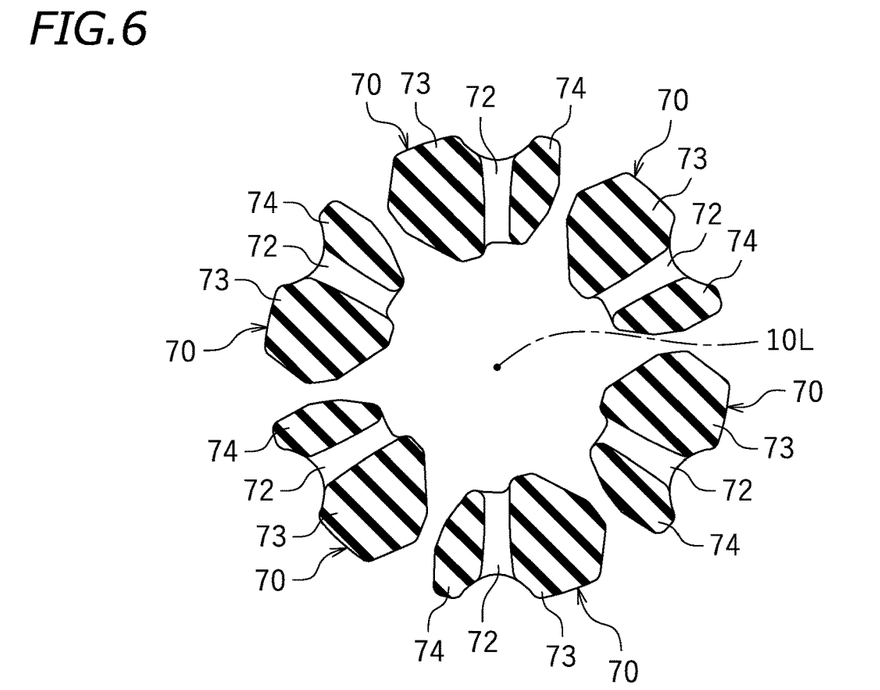
FIG. 6 is a cross-sectional view of absorbers taken along the line VI-VI of FIG. 3.
Figure 7:
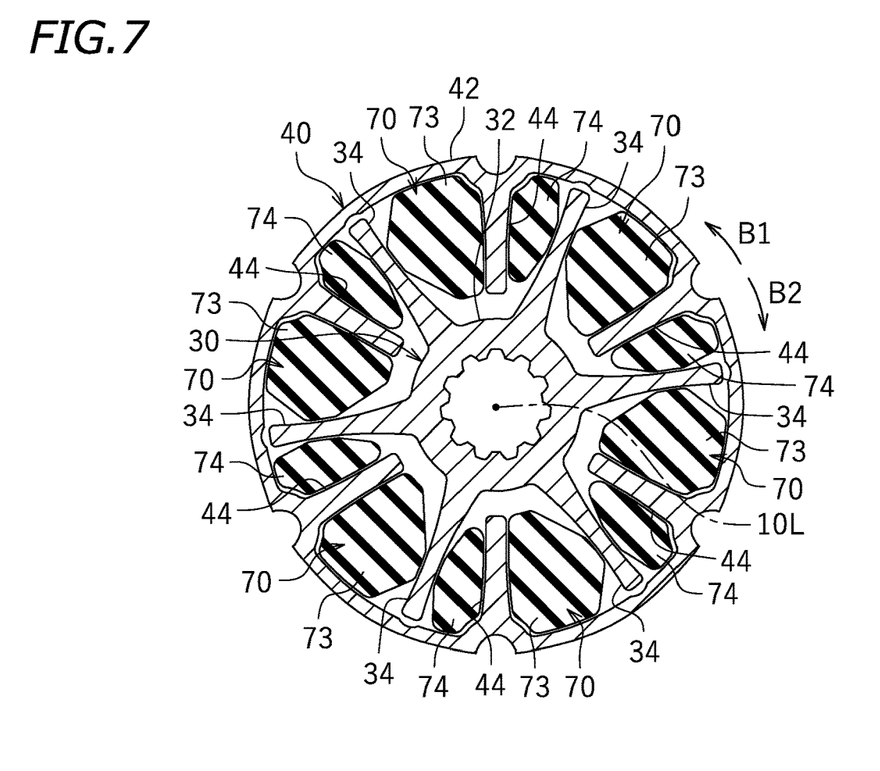
FIG. 7 is an end view of the clutch boss, the clutch sleeve, and the absorbers taken along the line VI-VI of FIG. 3.

FIG. 6 is a cross-sectional view of the absorbers 70 taken along the line VI-VI of FIG. 3. FIG. 7 is an end view of the clutch boss 30, the clutch sleeve 40, and the absorbers 70 taken along the line VI-VI of FIG. 3. As illustrated in FIG. 7, at least portions of the absorbers 70 are disposed between the first walls 34 of the clutch boss 30 and the second walls 44 of the clutch sleeve 40. The clutch 15 may be provided with any suitable number of absorbers 70. In the first embodiment, the number of absorbers 70 is six as illustrated in FIG. 6. The number of absorbers 70 is equal to the number of first walls 34 and the number of second walls 44. In the first embodiment, each absorber 70 includes: a groove 72 into which the associated second wall 44 is fitted; a first portion 73 located on a first side in a circumferential direction of the clutch shaft 10 relative to the groove 72; and a second portion 74 located on a second side in the circumferential direction relative to the groove 72. Each absorber 70 is provided with no through hole extending in the axial direction of the clutch shaft 10. Each groove 72 extends in the radial direction of the clutch shaft 10. Each groove 72 is recessed leftward. Fitting each second wall 44 into the associated groove 72 places each of the first and second portions 73 and 74 between the associated first wall 34 and the associated second wall 44. In the first embodiment, the volume of each first portion 73 is larger than the volume of each second portion 74. Alternatively, the volume of each first portion 73 may be equal to the volume of each second portion 74.

As previously mentioned, the drive force of the crankshaft 92 is transmitted from the clutch sleeve 40 to the clutch boss 30. The drive force is transmitted from the second walls 44 of the clutch sleeve 40 to the first walls 34 of the clutch boss 30 through the absorbers 70. In the first embodiment, the clutch sleeve 40 rotates in a counterclockwise direction B1 (hereinafter referred to as a "rotation direction B1") in FIG. 7. The first portion 73 of each absorber 70, which has a relatively large volume, is disposed in the rotation direction B1 relative to the associated second wall 44. The second portion 74 of each absorber 70, which has a relatively small volume, is disposed in a direction B2 relative to the associated second wall 44. The direction B2 is opposite to the rotation direction B1. Accordingly, a relatively large portion (i.e., the first portion 73) of each absorber 70 is disposed in the rotation direction B1 relative to the associated second wall 44 so as to more effectively reduce an impact transmitted from the second walls 44 to the first walls 34.

The structure of the clutch 15 has been described thus far. Effects to be produced by the clutch 15 according to the first embodiment will be described below.

As illustrated in FIG. 3, the clutch 15 according to the first embodiment includes the absorbers 70 disposed forward of (i.e., rightward of) the clutch housing 20. The axial dimension of the clutch 15 is thus reducible. The clutch sleeve 40 is disposed forward of the clutch boss 30. Accordingly, a sufficiently large space is provided between the clutch boss 30 and the clutch sleeve 40. A space for housing the absorbers 70 is thus increased so as to increase the absorbers 70 in size. Consequently, the first embodiment is able to increase the amount of energy absorbable by the absorbers 70 without increasing the size of the clutch 15.

In the first embodiment, the second boss portions 43 having the spring 60 attached thereto extend forward from the third disk portion 41 of the clutch sleeve 40. No second boss portion 43 for attachment of the spring 60 is present between the clutch boss 30 and the clutch sleeve 40. Accordingly, a sufficiently large space is provided between the clutch boss 30 and the clutch sleeve 40 without interference from the second boss portions 43. Because the second boss portions 43 cause no interference, the first embodiment is able to increase the absorbers 70 in size.

One preferred embodiment of the present invention has been described thus far. The above-described embodiment, however, is merely illustrative. Various other embodiments may be practiced. Other exemplary embodiments will be described below.

Second Embodiment

Figure 8:
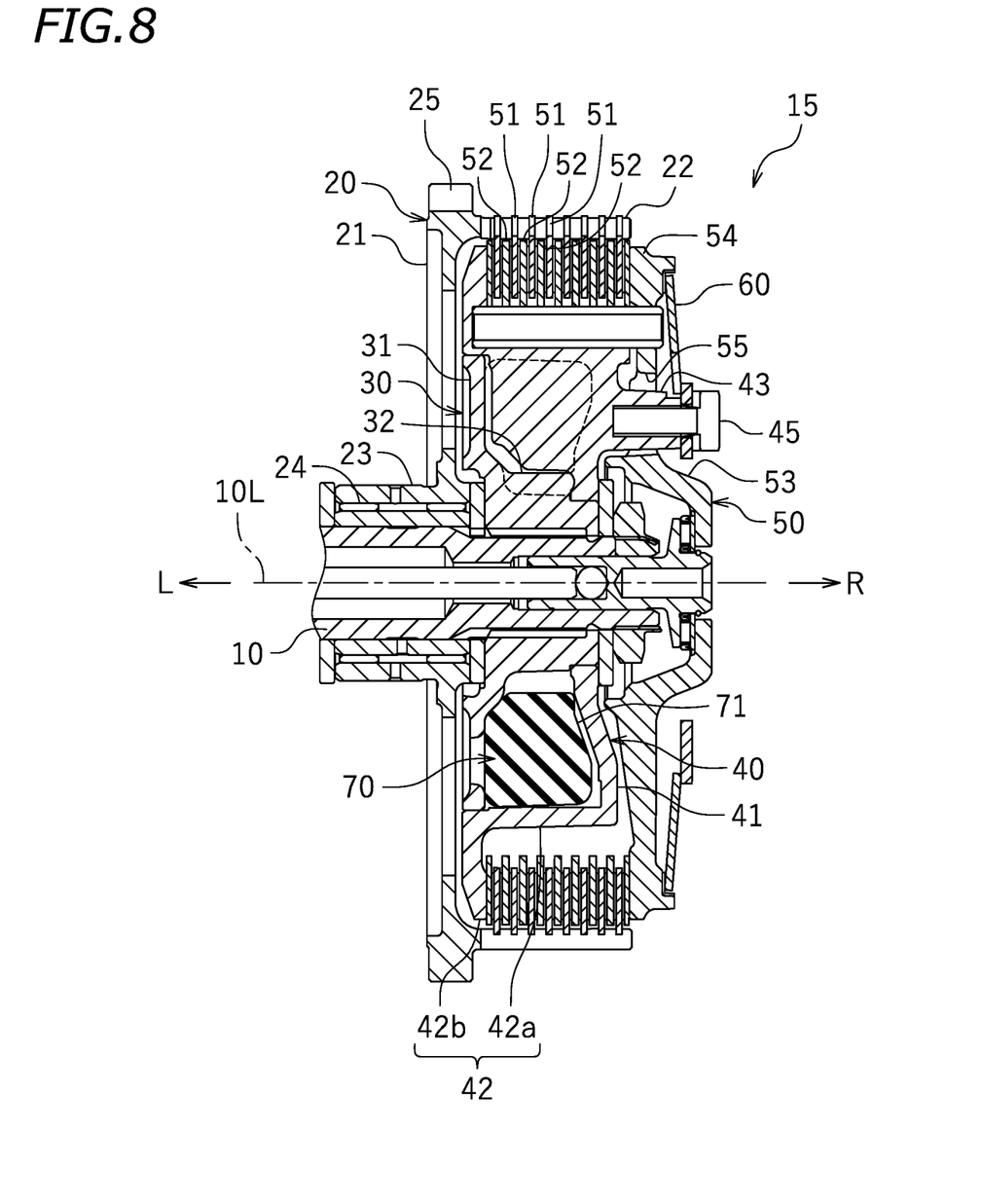
FIG. 8 is a cross-sectional view of a friction clutch according to a second embodiment of the present invention.

FIG. 8 is a cross-sectional view of the clutch 15 according to a second embodiment of the present invention. In the second embodiment, the second sleeve portion 42 of the clutch sleeve 40 includes: an inner region 42a extending leftward from the third disk portion 41; and an outer region 42b extending rightward from the left end of the inner region 42a. The outer region 42b is located radially outward of the inner region 42a. The second plates 52 are supported by the outer region 42b.

In the first embodiment, the third disk portion 41 of the clutch sleeve 40 extends perpendicularly or substantially perpendicularly to the axis 10L of the clutch shaft 10 (see FIG. 3). In the second embodiment, the third disk portion 41 of the clutch sleeve 40 extends outward in the radial direction of the clutch shaft 10 and rightward. The radially outer region of the third disk portion 41 is recessed rightward. The right surface of each absorber 70 faces the third disk portion 41. The right surface of each absorber 70, which faces the third disk portion 41, will be referred to as a "facing surface 71". The facing surface 71 extends outward in the radial direction of the clutch shaft 10 and rightward. The portion of each absorber 70 located outward in the radial direction of the clutch shaft 10 projects rightward in conformity with the recessed region of the third disk portion 41. Each absorber 70 conforms in shape to the clutch boss 30 and the clutch sleeve 40. Each absorber 70 has a shape conforming to a space defined between the clutch boss 30 and the clutch sleeve 40. Because the third disk portion 41 of the clutch sleeve 40 is recessed, the second embodiment is able to increase the dimension of each absorber 70 in the axial direction of the clutch shaft 10, enabling each absorber 70 to be larger in size.

In each of the embodiments described above, the clutch shaft 10 extends rightward. Alternatively, the clutch shaft 10 may extend in any other suitable direction. In one example, the clutch shaft 10 may extend leftward. In another example, the clutch shaft 10 may extend forward. In still another example, the clutch shaft 10 may extend rearward.

The drive source included in the power unit 5 is not limited to the internal combustion engine 90 but may be, for example, an electric motor. The drive source included in the power unit 5 may be any other suitable drive source.

As used herein, the term "straddled vehicle" refers to any vehicle that a rider straddles when riding on the vehicle. The straddled vehicle is not limited to the motorcycle 1. The straddled vehicle may be, for example, a motor tricycle, an all-terrain vehicle (ATV), or a snowmobile.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the invention. The invention may be embodied in many different forms. The present disclosure is to be considered as providing examples of the principles of the invention. These examples are described herein with the understanding that such examples are not intended to limit the invention to preferred embodiments described herein and/or illustrated herein. Hence, the invention is not limited to the embodiments described herein. The invention includes any and all embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A friction clutch comprising:
   a clutch shaft extending in a first direction;
   a clutch housing rotatable relative to the clutch shaft, the clutch housing including
     a first disk portion through which the clutch shaft passes, and
     a first sleeve portion extending in the first direction from the first disk portion;
   a clutch boss including
     a second disk portion disposed in the first direction relative to the first disk portion, and
     a first boss portion extending in the first direction from the second disk portion, the first boss portion being in engagement with the clutch shaft such that the first boss portion is non-rotatable relative to the clutch shaft;
   a clutch sleeve including a third disk portion disposed in the first direction relative to the second disk portion, and a second sleeve portion extending in a second direction from the third disk portion, the second direction being opposite to the first direction;

a plurality of first plates supported by the first sleeve portion, the first plates being arranged in the first direction;

a plurality of second plates supported by the second sleeve portion, the second plates being disposed such that the first and second plates are arranged alternately;

a pressure plate disposed in the first direction relative to the third disk portion, the pressure plate being configured to press the first and second plates against each other;

a spring attached to the clutch sleeve and the pressure plate, the spring urging the pressure plate toward the first and second plates; and an absorber that is a block formed of a resilient material, disposed in the first direction relative to the second disk portion and in the second direction relative to the third disk portion, the absorber being interposed between the clutch sleeve and the clutch boss, and being deformable to thereby reduce an impact transmitted from the clutch housing to the clutch boss.

2. The friction clutch according to claim 1, wherein
the clutch sleeve further includes a second boss portion extending in the first direction from the third disk portion, and
the spring is attached to the second boss portion with a bolt.

3. The friction clutch according to claim 1, wherein
the clutch boss further includes a first wall extending in the first direction from the second disk portion, the first wall extending outward from the clutch shaft in a radial direction of the clutch shaft,
the clutch sleeve further includes a second wall extending in the second direction from the third disk portion and extending inward from the clutch sleeve in the radial direction of the clutch shaft, and
at least a portion of the absorber is disposed between the first wall and the second wall as viewed in an axial direction of the clutch shaft.

4. The friction clutch according to claim 1, wherein
the third disk portion extends outward relative to the second sleeve portion in a radial direction of the clutch shaft and in the first direction, and
the absorber has a facing surface that faces the third disk portion, and that has a shape corresponding to a shape of the third disk portion.

5. The friction clutch according to claim 1, wherein
the absorber is made of rubber.

6. A straddled vehicle comprising the friction clutch according to claim 1.

7. The friction clutch according to claim 1, wherein
the absorber has, one a surface of the block, a groove, and
the absorber includes a first portion and a second portion that are respectively on two sides of the groove.

* * * * *